United States Patent [19]

Jacek

[11] Patent Number: 4,867,353
[45] Date of Patent: Sep. 19, 1989

[54] VOLUMETRIC METERING DEVICE

[76] Inventor: Stanley J. Jacek, 61 South West Highway, Wokalup, Western Australia, Australia, 6221

[21] Appl. No.: 926,003

[22] Filed: Oct. 31, 1986

[51] Int. Cl.⁴ .............................................. G01F 11/28
[52] U.S. Cl. ................................... 222/438; 222/449; 222/452; 222/556
[58] Field of Search ............................... 222/450–452, 222/439, 449, 438, 434, 425, 556, 511, 517, 305, 310, 344, 355, 361, 362, 476, 503, 502; 193/20, 21, 32

[56] References Cited

U.S. PATENT DOCUMENTS

| | | | |
|---|---|---|---|
| 513,803 | 1/1894 | Luster | 222/452 X |
| 1,938,942 | 12/1933 | Swartz | 222/439 X |
| 2,787,404 | 4/1957 | Vandenberg et al. | 222/438 X |
| 2,893,602 | 7/1959 | Barder et al. | 222/438 X |
| 3,257,045 | 6/1966 | Carpentier | 222/450 |
| 3,442,423 | 5/1969 | Cozad | 222/438 X |
| 3,916,949 | 11/1975 | Armstrong | 222/556 X |
| 4,102,477 | 7/1978 | Yoon | 222/452 X |

FOREIGN PATENT DOCUMENTS

| | | | |
|---|---|---|---|
| 494169 | 10/1938 | United Kingdom | 222/450 |
| 1571947 | 7/1980 | United Kingdom | 222/305 |

Primary Examiner—Joseph J. Rolla
Assistant Examiner—David H. Bollinger
Attorney, Agent, or Firm—Reising, Ethington, Barnard, Perry & Milton

[57] ABSTRACT

A volumetric metering device comprising a housing, a butterfly gate control unit and an adjuster to adjust the volume of a metering chamber whose operation is controlled by the butterfly gate control unit between a first condition to load the metering chamber with particulate material and a second condition to discharge the particulate material from the housing.

9 Claims, 3 Drawing Sheets

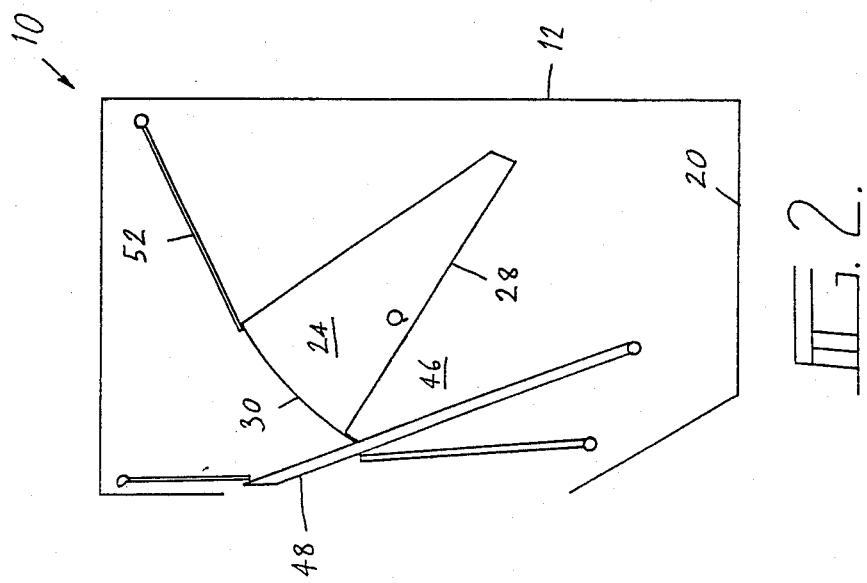
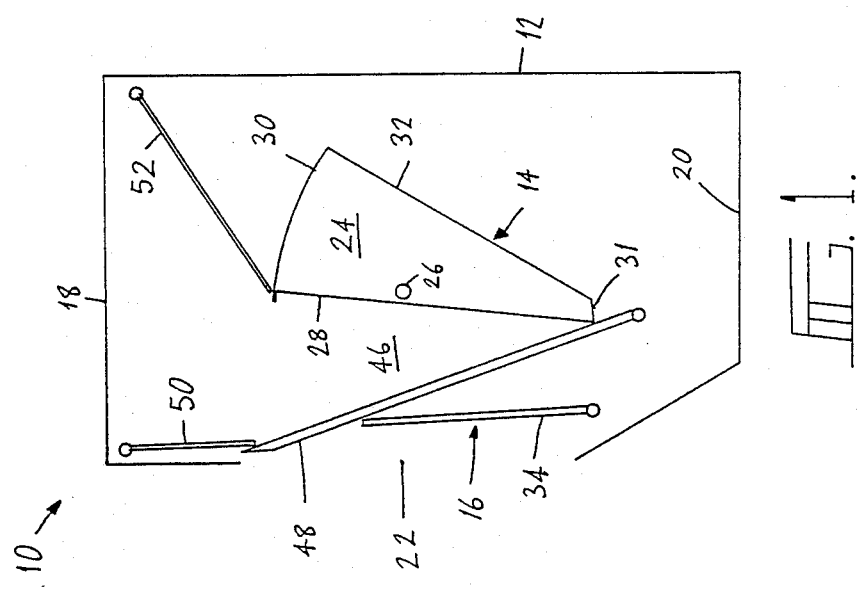

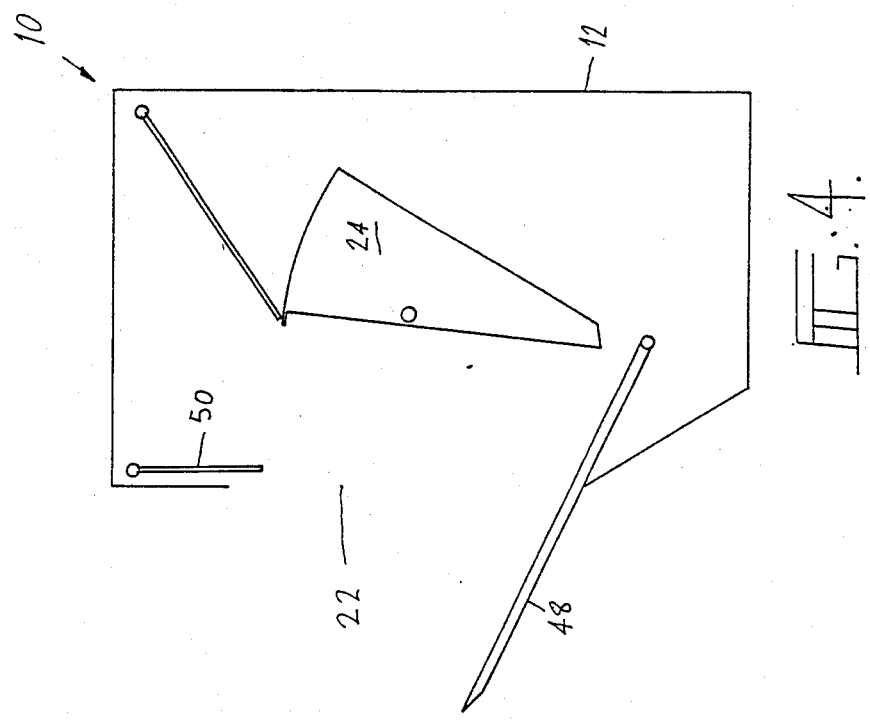
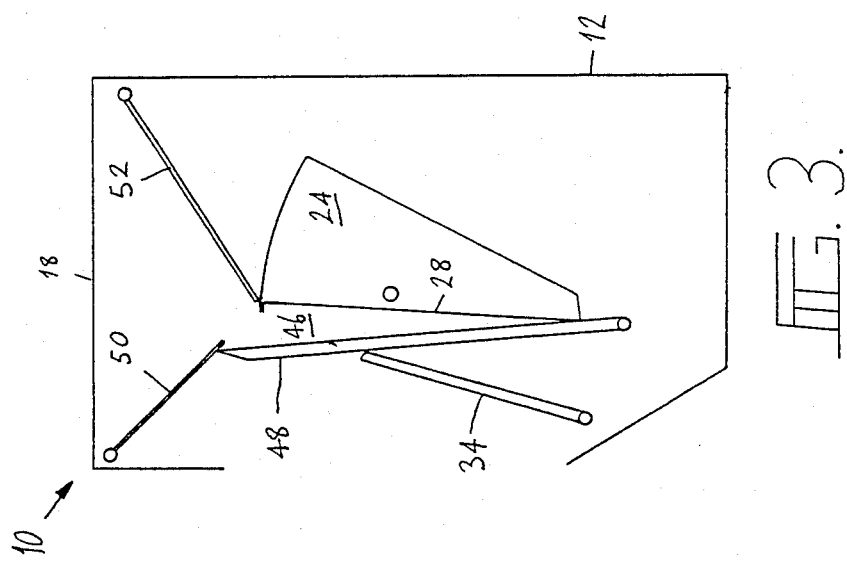

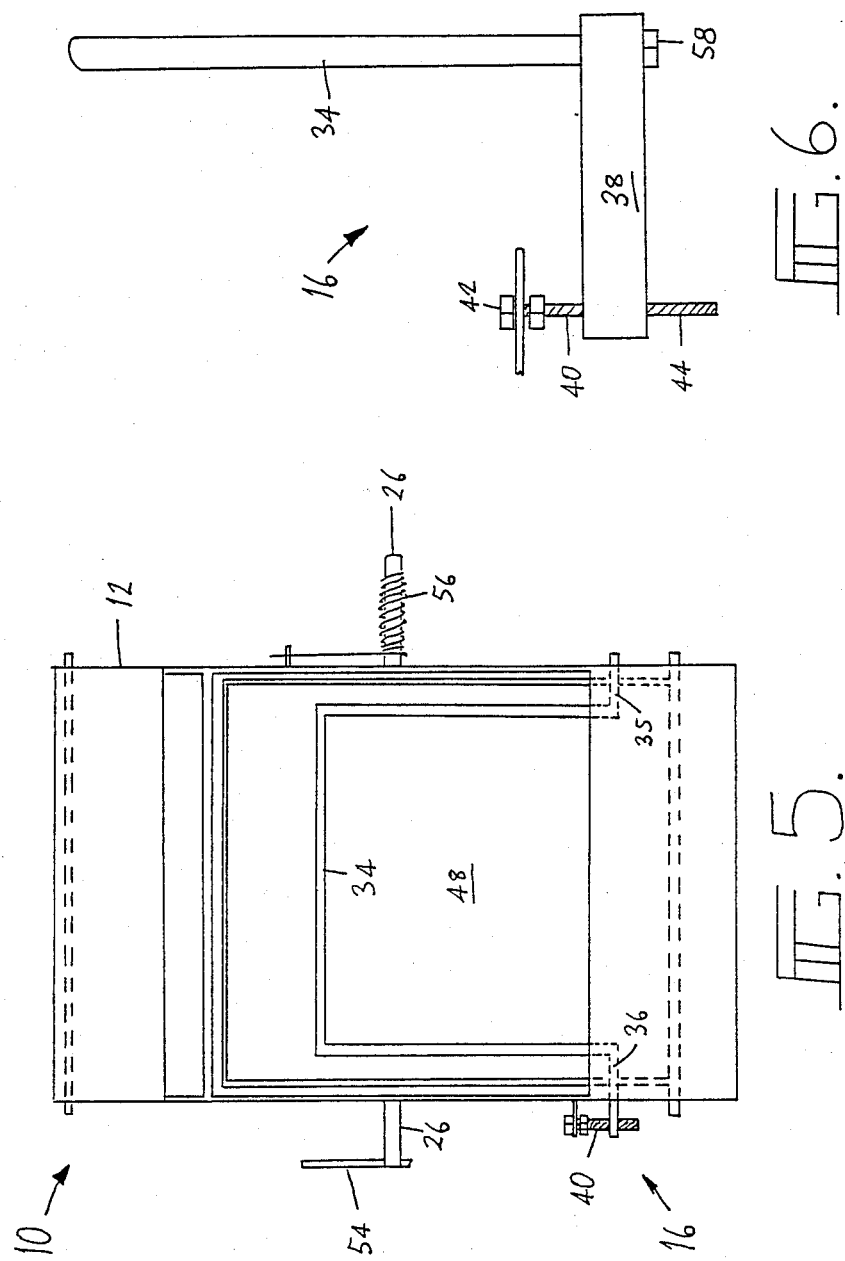

VOLUMETRIC METERING DEVICE

The present invention relates to a volumetric metering device.

The present invention is particularly concerned with accurate and reliable metering in the supply of particulate material such as granulated materials or powders for the provision of stock feed in agriculture or additives in mining or industrial operations which are normally supplied from overhead storage bins. In general, volumetric metering devices, particularly in agriculture, do not give sufficient control over the metered amount of particulate material nor is there adequate access into the volumetric metering device for the purposes of maintenance or removal of blockages. The present invention provides a volumetric metering device allowing relatively easy internal access and adjustment of metered volumes.

In accordance with the present invention there is provided a volumetric metering device comprising a housing, a butterfly gate control unit located within the housing and arranged to be pivoted between a first condition and a second condition, and an adjustment means disposed to adjust the pivotal movement of the butterfly gate control unit to adjust the volume of a metering chamber.

The present invention will hereinafter be described with particular reference to use in agriculture in feeding stock although it is to be understood that it is of general applicability.

The present invention will now be described by way of example with reference to the accompanying drawings, in which:

FIG. 1 is a schematic side view of a volumetric metering device in accordance with the present invention and showing a metering chamber thereof at maximum capacity and with a butterfly gate control unit in a first condition;

FIG. 2 is a schematic side view of the volumetric metering device of FIG. 1, showing the butterfly gate control unit in a second condition;

FIG. 3 is a schematic side view of the volumetric metering device of FIG. 1 and showing the metering chamber at minimum capacity;

FIG. 4 is a schematic side view of the volumetric metering device of FIG. 1 shown in a maintenance condition;

FIG. 5 is a schematic front view of the volumetric metering device of FIG. 1, and FIG. 6 is a side view of an adjustment means of the volumetric metering device of FIG. 1.

In FIGS. 1 to 5 there is shown a volumetric metering device 10 comprising a housing 12, a butterfly gate control unit 14 and an adjustment means 16.

The housing 12 comprises an inlet 18 at an upper end thereof and an outlet 20 at a lower end thereof.

The inlet is arranged to be attached to an overhead storage bin containing a store of feed for example. The outlet 20 is arranged to be attached to a feed trough (not shown) disposed for access to an animal to feed therefrom.

The housing 12 also comprises an inspection hatch 22 conveniently situated in the front thereof and disposed to allow access into the housing 12 for maintenance purposes and to remove blockages therefrom.

The butterfly gate control unit 14 comprises a baffle 24 fixed to a shaft 26. The shaft 26 is pivotably mounted into the housing 12 in a horizontal manner to allow for horizontal pivotal movement of the baffle 24 thereabout from a first condition as shown in FIG. 1 to a second condition as shown in FIG. 2.

The baffle comprises a front face 28, an upper curved surface 30, a lower edge 31 and one or more gussets 32 joining the upper curved surface 30 to the front face 28. Preferably, the shaft 26 is fixed to the baffle 24 intermediately of the height of the front face 28 and closer to the upper curved surface 30 than the lower edge 31. Such arrangement has preferred results as described hereinafter.

The adjustment means 16 comprises a crank mechanism 34 particularly as shown in FIGS. 1, 5 and 6. The crank mechanism 34 is pivotably fixed into the housing 12 and has two legs 35 and 36 extending through the housing 12 (FIG. 5). The leg 36 has a lever 38 (FIG. 6) fixed to it and a bolt 40 having a head 42 rotatably fixed to the housing 12 and a threaded shank 44 threadedly engaged with the lever 38.

Rotation of the bolt 40 produces displacement of the lever 38 up or down the shank 44 and hence pivotal movement of the crank mechanism 34 about the legs 35 and 36.

The volumetric metering device 10 also comprises a metering chamber 46 as shown in FIGS. 1 to 4. The metering chamber 46 is defined by the front face 28 of the baffle 24 and a sealing plate 48.

The sealing plate 48 is pivotally fixed to the housing 12 at one end and rests against the crank mechanism 34 adjacent an opposite end.

Pivotal movement of the crank mechanism 34 produces pivotal movement of the sealing plate 48 and adjustment of the volume of the metering chamber 46. The volume of the metering chamber 46 can thus be adjusted between a maximum as shown in FIG. 1 to a minimum approximately as shown in FIG. 3.

Two further sealing plates 50 and 52 are provided to seal the sealing plate 48 and the curved surface 30 of the baffle 24, respectively, to the housing 12. The sealing plates 50 and 52 are also pivotally fixed into the housing 12 to allow movement with the sealing plate 48 and the curved surface 30, respectively. The sealing plates 50 and 52 thus guide the particulate material from the storage bins to the metering chamber 46.

The shaft 26 comprises a handle 54 protruding from the housing 12 and disposed to allow rotation of the baffle 24 between the first and the second conditions. A return spring 56 is provided to urge the baffle 24 to the first condition. The spring 56 is conveniently applied to the shaft 26 as shown in FIG. 5.

The adjustment means 16 comprises a further bolt 58 disposed to connect the leg 36 to the lever 38. The bolt 58 conveniently threadedly engages both the leg 36 and the lever 38. Removal of the bolt 58 from the leg 36 and the lever 38 allows the crank mechanism 34 to be removed from the housing 12 and the sealing plate 48 allowed to pivot forwardly as shown in FIG. 4 to enable access into the housing for the purposes of maintenance or to remove blockages.

It is envisaged that other forms of adjustment means 16 could be used in the present invention. It is envisaged that the handle 54 could be manually, pneumatically, electrically or hydraulically operated. In use, the volumetric metering device 10 has its inlet 18 attached to an overhead storage bin and its outlet 20 attached to a feed trough disposed for access to an animal to feed therefrom.

The volume of a unit of feed to be metered out to the feed trough is adjusted by use of the adjustment means 16 as described hereinabove.

Once the volume of the metering chamber 46 has been so adjusted particulate material may be introduced from the storage bin into the metering chamber 46 guided by the sealing plates 50 and 52.

When the metering chamber 46 is full the handle 54 may be operated to pivot the baffle 24 about the shaft 26 to move the baffle 24 from the first condition to the second condition against the returning force of the spring 56.

As the baffle 24 pivots the upper curved surface 30 moves to cut off the supply of particulate material and the lower edge 31 moves away from the sealing plate 48 to release the particulate material from the metering chamber 46.

Since the shaft 26 is closer to the upper curved surface 30 the volume between the sealing plate 48 and the front face 28, namely the metering chamber increases as the baffle 24 moves toward the second condition.

Consequently, the particulate material may freely fall under the action of the force of gravity and the upper curved surface 30 may relatively easily move to cut off the supply of particulate material.

The result is that the volumetric metering device 10 meters out a volume of particulate material from the metering chamber 46, which volume is substantially that which was set by the adjustment means 16.

Once the particulate material has been metered out of the metering chamber 46 the handle 54 may be released, at which time the spring 56 returns the baffle 24 to the first condition.

As the baffle 24 returns to the first condition particulate material begins to fall into the metering chamber 46. The lower edge 31 moves to close the bottom of the metering chamber 46 faster than the upper curved surface 30 moves to open the top of the metering chamber 46 and consequently the baffle 24 returns to the first condition before any substantial quantity of particulate material falls directly through to the outlet 20.

When the volumetric metering device 10 is to be maintained or obstructions removed from within it, the crank mechanism 34 is removed as described hereinabove and the sealing plate 48 laid forwardly to expose the baffle 24 as shown in FIG. 4.

The volumetric metering device 10 of the present invention allows for relatively accurate metering of particulate materials such as for the purposes of metering units of feed to stock animals.

Control over the volume of the metered unit of particulate material is provided by the adjustment means 16.

Further, by provision of the bolt 58 access into the housing 12 is readily achievable and so maintenance and removal of obstructions is readily facilitated. It is envisaged that a removable panel may be provided to cover the inspection hatch 22 when the volumetric metering device is in use.

Modifications and variations such as would be apparent to a skilled addressee are deemed within the scope of the present invention.

I claim:

1. A volumetric metering device comprising a housing, a butterfly gate control unit having a baffle with a lower edge and a front face adjacent thereto and located within the housing, the baffle being arranged to be pivoted between a first condition of filling the device and a second condition of emptying the device, a sealing plate located adjacent said lower edge, a metering chamber defined by the front face and the sealing plate, the metering chamber having a greater volume in the second condition than in the first condition, and a shaft disposed to pivotally move the baffle between the first condition and second condition changing the volume of the metering chamber, and adjustment means comprising a crank mechanism disposed in contact with the sealing plate and arranged to pivotally displace the sealing plate with respect to the front face in order to adjust the volume of the metering chamber.

2. A volumetric metering device according to claim 1 in which the baffle includes an upper curved surface, the shaft being fixed to the baffle closer to the upper curved surface, than the lower edge, the metering chamber having a lesser volume in a first condition with the lower edge in contact with the sealing plate when loading the device than in a second condition with an edge of the upper curved surface in contact with the sealing plate when unloading the device.

3. A volumetric metering device according to claim 2, in which the crank mechanism is pivotably fixed to the housing by a first and a second leg, the first leg being detachably attached to a lever and thereby to a handle wherein the lever is detached from the first leg to allow removal of the crank mechanism from the housing and thereby allows access into the housing.

4. A volumetric metering device according to claim 2, in which the front face is flat from the lower edge to the upper curved surface, the front face and the sealing plate forming an inlet opening when in the first condition and an outlet opening in the second condition, the outlet opening having a greater area than the inlet.

5. A volumetric metering device comprising a housing, a butterfly gate control unit having a baffle with a lower edge and a front face adjacent thereto and located within the housing, the baffle being arranged to be pivoted between a first condition of loading the device and a second condition of unloading the device, a sealing plate adjacent the lower edge, a metering chamber defined by the front face and sealing plate, and adjustment means for pivotally displacing the sealing plate with respect to said front face to pivotally adjust the volume of the metering chamber.

6. A volumetric metering device comprising
   (a) a housing;
   (b) a butterfly gate control unit located within the housing and comprising
      (i) a baffle having a front face, an upper curved surface adjacent the front face and a lower edge adjacent the front face and opposite the upper curved surface;
      (ii) a shaft fixed to the baffle closer to the upper curved surface relative to the lower edge, the shaft allowing pivotal movement of the baffle; and
      (iii) a spring fixed between the butterfly gate control unit and the housing;
   (c) a sealing plate located within the housing and adjacent the front face of the baffle to define a metering chamber, the sealing plate being disposed to meet the lower edge of the baffle in a first condition of filling the metering chamber and the sealing plate also being disposed to meet the front face adjacent the upper curved surface in a second condition of emptying the metering chamber, the metering chamber having a greater volume in the second condition than in the first condition, and (d) adjacent means comprising a crank mechanism disposed in contact with the sealing plate to pivotally displace the sealing plate with respect to the front face in order to adjust the volume of the metering chamber, the shaft being able to pivotally move the baffle between the first and second conditions against a return force of the spring which urges the baffle toward the first condition.

7. A volumetric metering device according to claim 6, in which the crank mechanism comprises a first leg and a second leg each pivotally fixed to the housing, the adjustment means also comprises a lever detachably attached to the first leg, such that detachment of the lever from the first leg allows removal of the crank mechanism from the housing and thereby access into the housing.

8. A volumetric metering device according to claim 7, in which the shaft includes a handle disposed to allow pivoting of the baffle between the first and the second condition.

9. A volumetric metering device according to claim 6, in which a first distance measured from the front face of the baffle adjacent the upper curved surface to the sealing plate is greater than a second distance measured from the front face adjacent the shaft to the sealing plate, in the first condition, and a third distance measured from the lower edge of the baffle to the sealing plate is greater than a fourth distance measured between the front face adjacent the shaft to the sealing plate, in the second condition, and the first distance in the first condition is less than the third distance in the second condition.

* * * * *